Aug. 16, 1955 F. A. KROHM 2,715,238
WINDSHIELD WIPER ARM
Filed March 21, 1951
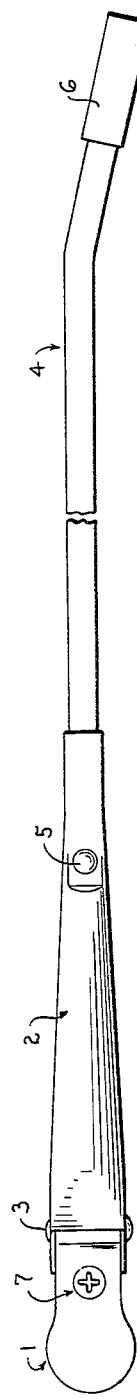
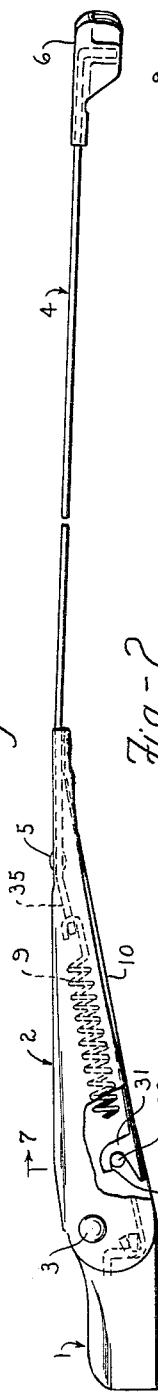
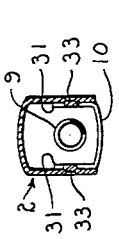
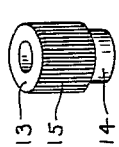
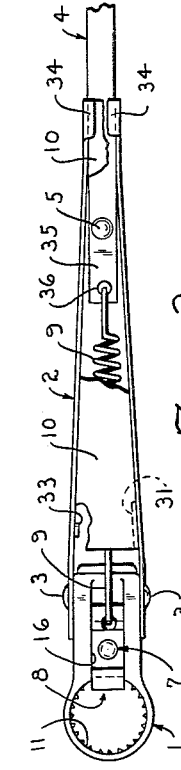
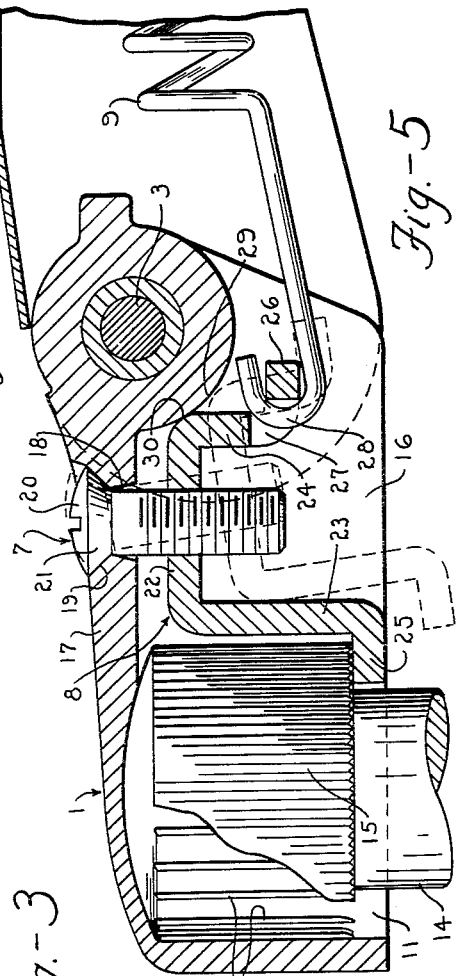
INVENTOR.
FRED A. KROHM
BY
Charles S. Penfold
ATTORNEY

United States Patent Office 2,715,238
Patented Aug. 16, 1955

2,715,238

WINDSHIELD WIPER ARM

Fred A. Krohm, Gary, Ind., assignor to Productive Inventions, Inc., a corporation of Indiana Application March 21, 1951, Serial No. 216,779

5 Claims. (Cl. 15—255)

This invention relates generally to windshield wiper arms and particularly to improvements for detachably connecting an arm to a drive shaft.

The invention is adapted for use with a wiper arm assembly comprising an inner shaft receiving section, an arm pivotally connected to the inner section, and a spring for urging the arm and a wiper blade carried thereby toward a windshield.

The primary object of the invention is to provide the inner shaft receiving section of the arm assembly with a device comprising a locking element for engaging a shoulder or abutment provided on the shaft, means for manually operating the element and a connection between the spring and device so that when the manual operating means is manipulated to disengage the element from the shaft, the spring will automatically cause the device to move outwardly away from the shaft and thereby assist in disconnecting the arm assembly from the shaft. The manual operating means is preferably made in the form of a screw which extends through the shaft receiving section and carries the locking element preferably made in the form of a latch. The arrangement is preferably such that when the screw is tightened the tension of the spring will be increased to press a wiper blade on the arm with greater force against a windshield. Furthermore, the spring offers sufficient tension to prevent accidental movement of the screw after it has been adjusted to cause the element to lock the arm assembly onto a shaft.

Another object of the invention is to provide the shaft receiving section of the arm assembly with an abutment or cam which forms a fulcrum for the locking element and assists in directing the element in holding relationship with a drive shaft when the screw is tightened.

A further object of the invention is to provide the wiper arm assembly with a cover for substantially concealing from view the spring and its connection with the arm.

Other objects and advantages of the invention will appear after the description hereinafter set forth is considered in conjunction with the drawings annexed hereto.

In the drawings where like parts are identified by the same numerals:

Figure 1 is a top view of the arm assembly embodying the invention;

Figure 2 is a side view in elevation of the arm assembly shown in Figure 1;

Figure 3 is a bottom view of the arm assembly with portions thereof broken away to illustrate details of construction;

Figure 4 is a perspective view of a drive shaft with a key or drum carried thereby which is received in the shaft receiving section of the arm assembly;

Figure 5 is an enlarged longitudinal sectional view taken through a portion of the arm assembly to exemplify its operative relationship with a drive shaft;

Figure 6 is a transverse sectional view taken through a part of the shaft receiving section of the arm assembly and the key or drum part for the purpose of illustrating the interlocking relationship between longitudinal serrations provided on the periphery of the key and inner cylindrical surface of the shaft engaging section of the arm assembly; and Figure 7 is a transverse sectional view taken substantially on line 7—7 of Figure 2 and shows one way of connecting the cover to the arm.

The arm assembly above referred to includes, among other things, an inner shaft receiving section or fitting 1, an intermediate channel section 2 pivotally connected to the inner section 1 by means of a cross pin 3, an outer bar section 4 having its inner end secured in the channel section by a rivet 5, a connector 6 carried by the outer end of the bar section for supporting a wiper blade, a manually operable means, preferably in the form of a screw 7 supporting a locking element, preferably in the form of a latch 8, an elongated helical spring 9 having its opposite ends respectively connected to the bar section and the latch, and an elongated cover 10 secured to the channel section.

More particularly, the shaft receiving section 1 of the wiper arm assembly is preferably cast and made in the form of a cap having a cylindrical recess or socket 11, the cylindrical wall thereof being provided with a plurality of relatively coarse longitudinal serrations or teeth 12. The cap section 1 detachably receives a cylindrical key or drum 13 carried by a drive shaft 14. The key may be a separate part secured to the shaft or constitute an integral part or enlargement thereof. The periphery of the key is provided with a plurality of relatively fine longitudinal serrations or teeth 15 which are adapted to interengage with the serrations 12. These serrations afford an arrangement whereby the arm can be secured to the key in substantially any relative rotative position desired for movement with the key. The number and size of the serrations are immaterial insofar as the invention is concerned.

The shaft receiving section includes a radial offset formed with a longitudinal recess 16 which intersects the cylindrical recess 11 as shown in Figure 5. The inner section is also formed with an outer wall 17 which is common to the cylindrical recess and the longitudinal recess. That portion of the outer wall 17 which constitutes the base wall of the cylindrical recess 11 engages the outer end of the key to limit inward movement of the inner section. That portion of the outer wall 17 constituting the base wall of the longitudinal recess 16 is provided with an opening 18 countersunk at 19. The screw 7 extends through the opening with its head 20 seated in the countersink. The opening is preferably tapered in order to permit tilting of the screw as indicated by the dotted lines in Figure 5 of the drawing and the countersink is so formed that the peripheral edge 21 of the screw will remain nested in the countersink.

The latch 8 is threadedly connected to and supported by the screw 7. The latch may be designed and constructed as desired, but as herein shown includes a base portion 22 and a pair of parallel leg portions 23 and 24. The leg 23 is preferably made longer than leg 24 and provided with a rearwardly extending offset 25 which is adapted to bear against the underside or end of the key and lock the arm assembly to the key. The underside of the key constitutes a shoulder or abutment. The shorter leg is provided with a forwardly extending offset 26. The junction between the shorter leg and its offset is provided with an aperture 27 which detachably receives a hook 28 formed on the inner end of the helical spring 9.

A different way of supporting a locking element is disclosed and claimed in my copending application Serial No. 221,387 filed April 17, 1951, and additional means for adjusting the tension of the spring is disclosed and claimed in a copending application of John W. Anderson Serial No. 235,001 filed July 3, 1951.

The radial offset of the inner shaft receiving section 1 of the arm assembly is further formed with a convex cam surface 29 which provides a fulcrum for the latch. The arrangement of the various components is such that as the screw is loosened, the spring 9 will cause the latch and screw to automatically swing outwardly as exemplified by the dotted lines in Figure 5. The junction between the base wall 22 and leg 24 of the latch is preferably rounded at 30 and bears against the cam surface 29 in a manner to locate the line of force created by the spring in a predetermined position so that the arm sections 2 and 4 as a unit will always be urged toward a windshield. When the latch and screw have been retracted to their respective dotted line positions, the arm assembly can be readily applied to a shaft by merely pressing the inner section over the key 13 in a predetermined rotative position and then tightening the screw. When the screw is tightened the rounded junction 30 of the latch will be pulled against the cam surface 29 causing the latch and screw to move or pivot rearwardly until the offset 25 of the latch is located axially opposite the underside of the key, which locks the arm assembly to the shaft. It will be noted that when the latch is in a locking position, no part or portion thereof will engage the serrations on the key. This prevents damage to the serrations. This unique locking device has proven satisfactory in use and permits release of the arm assembly from the shaft by merely loosening the screw sufficiently to retract the latch in contrast to those arm assemblies which require prior manipulation or movement of the arm proper to effect operation of the latch.

Insofar as the invention is concerned the inner end of the spring 9 could be connected to the leg 23 of the latch or to the shank of the screw in lieu of being connected to the leg 24.

As pointed out above, one feature of the invention resides in providing an elongated cover for the spring and its connection with the outer bar section 4 of the arm assembly. More particularly in this respect the cover is of a size and shape to fit substantially within the confines of the intermediate channel section 2 of the arm assembly. The inner extremity of the cover is provided with a pair of inturned parallel portions 31 having notches 32 formed therein, which receive inturned integral projections 33 provided on the side walls of the channel section as clearly illustrated in Figures 2 and 7. The arrangement is preferably such that the cover is fitted into place so that the notches receive the projections, after which ears 34 formed on the outer extremity of the channel section are clamped down upon the reduced outer extremity of the cover and bar section 4 for simultaneously anchoring the cover and bar in the channel section. The length of the cover is such that when the ears are clamped down upon the cover, the inturned portions of the cover cannot be disconnected from the projections on the channel.

As stated above, the inner end of the bar section 4 is preferably permanently secured in the channel by a rivet 5. The inner end of the bar section is preferably provided with an offset 35 having a hole 36 therein which receives the outer hooked end of the spring 9 as clearly shown in Figures 2 and 3. Obviously insofar as the invention is concerned it is immaterial whether the spring 9 is connected to the bar 4 or to some part of the channel section 2.

While I have shown and described my invention in connection with a certain specified embodiment, it will, of course, be understood that I do not wish to be limited thereto, since it is apparent that modifications may be made in such embodiment and the materials thereof without departing from the spirit and scope of my invention as set forth in the appended claims.

I claim:

1. A windshield wiper arm assembly adapted to be attached to a drive shaft provided with an enlargement, said assembly comprising a housing adapted to receive the enlargement, manually operable means mounted on said housing for adjustment, a locking element for engaging the enlargement arranged in the housing and carried by said manually operable means, said assembly including an outer arm unit pivotally connected to the housing, and a spring having one end connected to the outer arm unit and its other end to the locking element, said manually operable means when operated in a certain way serving to actuate the locking element to engage the enlargement and increase the tension of the spring.

2. A windshield wiper arm assembly adapted to be attached to a drive shaft, said assembly comprising a housing adapted to receive an end of the shaft, a screw swingably mounted on said housing for adjustment exteriorly thereof, a locking element for engaging the shaft end arranged in the housing and carried by said screw, said assembly including an outer arm unit pivotally connected to the housing, and a spring having one end connected to the outer arm unit and its other end to the locking element, said screw when tightened serving to simultaneously cause the locking element to move in a direction for engaging a shaft and increase the tension of the spring.

3. A windshield wiper arm assembly adapted for attachment to a drive shaft provided with abutment means, said assembly comprising a part provided with a cylindrical recess adapted to receive the shaft end and a longitudinal recess communicating with the cylindrical recess, a locking device comprising a screw carried by the part arranged for adjustment exteriorly of the part and a locking element carried by the screw and disposed substantially within the confines of the longitudinal recess, abutment means provided on said element, said assembly also including an outer arm unit pivotally connected to the part, and an elongated helical spring having one end connected to the locking device and its other end to the outer arm unit, the arrangement being such that when the arm assembly is applied to the shaft end and the screw is tightened the abutment means on the locking element will engage the abutment means on the shaft end and thereby tend to force the part axially onto the shaft.

4. A windshield wiper arm assembly adapted to be attached to the end portion of a drive shaft provided with abutment means, said assembly comprising a housing adapted to receive the end portion, a locking device comprising a manually operable means mounted on said housing for adjustment and a locking element for engaging the abutment means, said locking element being arranged and operatively connected to said manually operable means, said assembly including an outer arm unit pivotally connected to the housing, and a spring having one end connected to the outer arm unit and its other end to the locking device, said manually operable means when operated in a certain way serving to cause the locking element to engage the abutment means on the shaft to secure the arm assembly thereto and when operated in another way the spring will pull the locking element away from the end portion of the shaft to permit removal of the arm assembly therefrom.

5. A subassembly for attaching a windshield wiper arm to a drive shaft comprising a fitting adapted to receive an end of the shaft, a locking element movably mounted on the fitting for engaging the shaft end, manually operable means carried by the fitting and operatively connected to the locking element, and a spring having one end connected to the locking element and another end for connection with a wiper arm.

References Cited in the file of this patent

UNITED STATES PATENTS

| | | |
|---|---|---|
| 1,952,866 | Hueber | Mar. 27, 1934 |
| 2,326,402 | Smulski | Aug. 10, 1943 |
| 2,365,251 | Curtiss | Dec. 19, 1944 |